United States Patent [19]

Eppley

[11] 4,375,162
[45] Mar. 1, 1983

[54] PORTABLE AIR TEST KIT AND SYSTEM

[76] Inventor: Robert S. Eppley, 921 Shirley Manor Rd., Reisterstown, Md. 21136

[21] Appl. No.: 247,721

[22] Filed: Mar. 26, 1981

[51] Int. Cl.$^3$ ............................................. G01M 3/02
[52] U.S. Cl. ......................................... 73/37; 73/431; 200/61.62; 417/411
[58] Field of Search ................... 73/37, 412, 431, 40.5; 417/411; 200/61.62

[56] References Cited

U.S. PATENT DOCUMENTS

| | | | |
|---|---|---|---|
| 1,973,378 | 9/1934 | Graesser | 200/61.62 |
| 2,332,725 | 10/1943 | Jordan | 73/4 R |
| 3,015,281 | 1/1962 | Umholz | 417/411 |
| 3,243,100 | 3/1966 | Adams | 417/411 |
| 3,903,745 | 9/1975 | Bosler | 73/431 |
| 3,943,313 | 3/1976 | Carboni | 200/61.62 |

Primary Examiner—S. Clement Swisher
Attorney, Agent, or Firm—Walter G. Finch

[57] ABSTRACT

The invention is an improved air test means in kit form that is portable and, additionally, includes a complete system arrangement for a plurality of modes of use. The portable kit is self contained for compressing air with a built-in power supply means. The system includes a high pressure test means, and a facility for storage of auxiliary equipment. The system, in addition to the built-in power supply means, has provisions for convenient operation from an external power supply means of comparable voltage output or for support power to preserve the built-in power supply means. Means are provided for convenient recharging of the built-in power supply means and for the attachment and use of auxiliary equipment such as a portable light means. The kit housing is provided with a safety vent for the power supply means and an automatic shut-off means if the kit is closed without first stopping the operating mechanism.

17 Claims, 8 Drawing Figures 4,375,162

PORTABLE AIR TEST KIT AND SYSTEM

BACKGROUND AND SUMMARY OF THE INVENTION

The invention relates to test units or test means and particularly to air test units and means. Specifically, the invention relates to a portable air test unit in kit form with a complete system arrangement for a plurality of modes of use.

A need has existed for an air test means, particularly for high pressure tests, that would eliminate the need for towing or otherwise transporting heavy duty type compressor or cylinders to the site of the test, then arranging a temporary piping or pressure base system from the compressor means to the site of the actual test. Such prior art air test means, often referred to as "portable" because they could be towed to the site of the test, were heavy and bulky and needed other auxiliary means to be moved. Those prior art test means were also expensive to obtain, extremely noisy, and expensive to operate.

The present invention is small, its portability is obvious in that it is in kit form and can be hand-carried like a small tool box or tool kit. Externally, it appears to be a small tool kit or tool box.

The entire air test unit or means is contained in the small tool box-like container. The unit is self-contained, having its own compressor means to provide a high pressure test, a power supply means, high pressure test connecting means, a facility for storing these testing means as well as other auxiliary equipment of the complete system.

The present invention also is arranged for a plurality of modes of operation that adds to the flexibility of use of the self-contained unit and system. It is a truly portable air test unit and system in kit form.

It is, therefore, an object of the invention to provide an air test unit that is in kit form.

It is another object of the invention to provide an air test unit that is portable, and particularly portable manually by a person.

It is also an object of the invention to provide an air test unit that includes a system arrangement for its use in a plurality of modes.

It is still another object of the invention to provide an air test unit that is wholly self-contained to compress air.

It is yet another object of the invention to provide an air test unit that is capable of providing a high pressure test.

It is yet still another object of the invention to provide an air test unit that has a built-in power supply.

Further objects and advantages of the invention will become more apparent in the light of the following description of the preferred embodiments.

DESCRIPTION OF THE PREFERRED EMBODIMENTS

Figure 1:
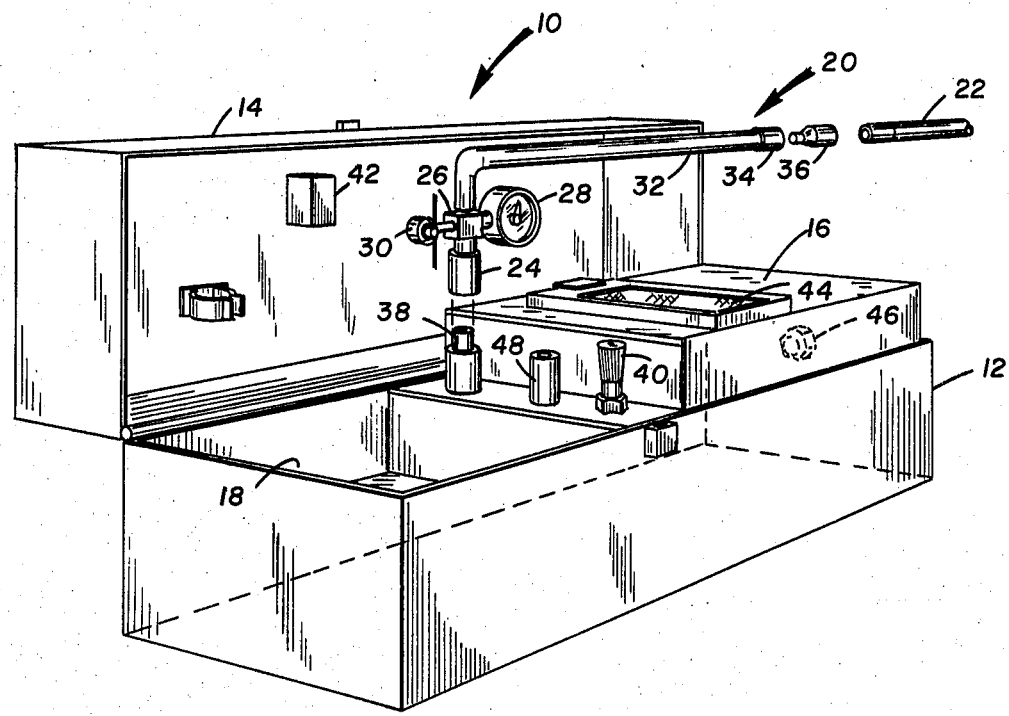
FIG. 1 is a pictorial view of a portable air test kit and system.
Figure 3:
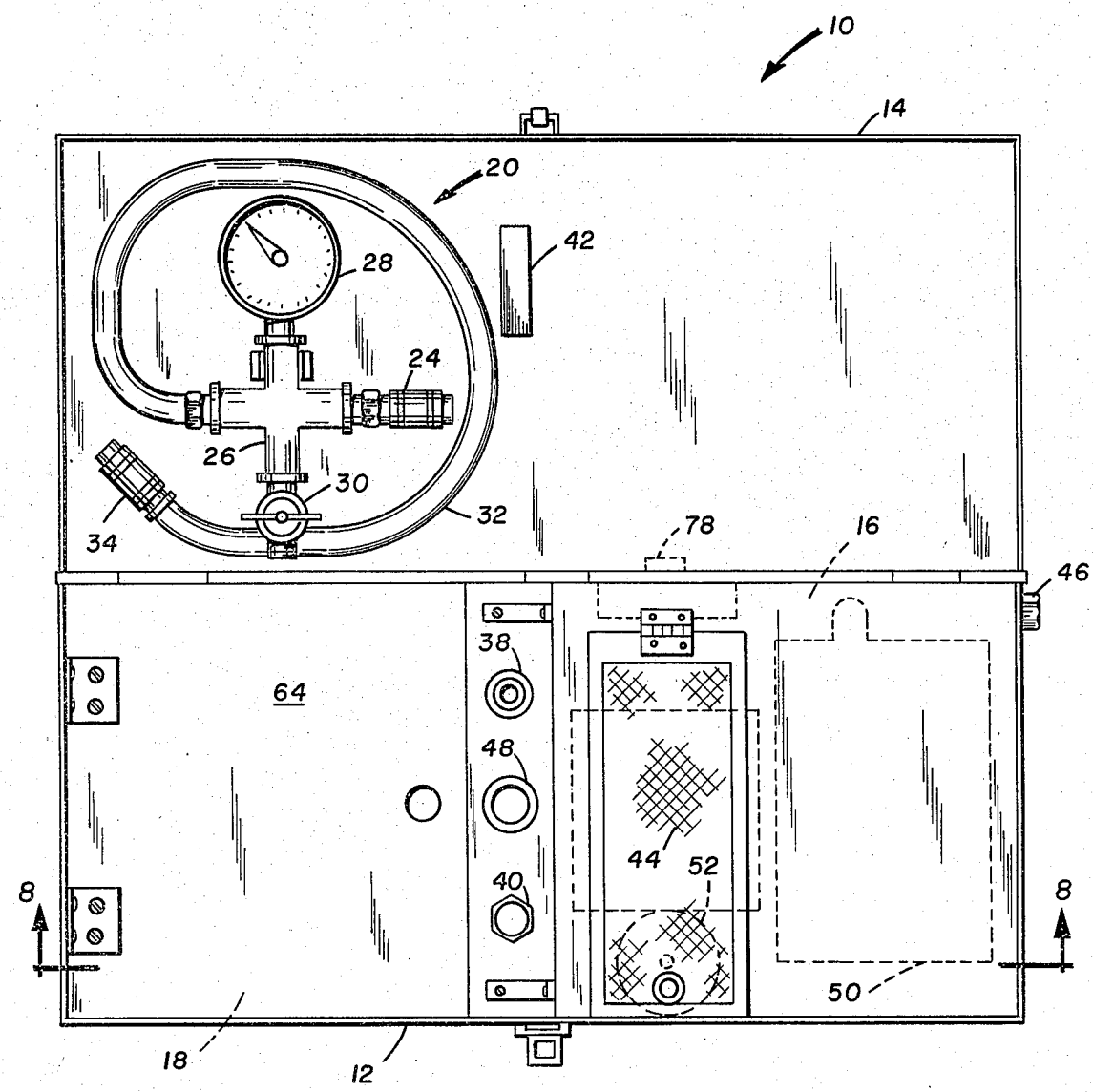
FIG. 3 is an open top view of a portable air test kit.

Referring to the drawings and particularly to FIGS. 1 and 3, an improved portable air test kit and system is shown at 10. The portable air test kit and system 10 consists of a housing or case or container means 12 with a lid or closure cover means 14, the enclosed internal contents of which is described hereinafter, and a high pressure test component 20, the elements of which are also described hereinafter. The lid or cover means 14 may be hinged or removably affixed.

The housing or case or container means 12 with lid 14 is essentially or substantially similar to a hand carried tool box. The tool box-like container means 12 has two major compartments, a power unit compartment 16 and an auxiliary equipment compartment 18.

Referring to FIG. 3, the power unit compartment 16 houses: a power supply means 50, such as a direct current battery, similar to a motorcycle battery, removably affixed in the power unit compartment 16; and a compressor means 52, the compressor means 52 being a combination compressor with attached motive power means that is small enough to fit into the power unit compartment 16, but powerful enough to provide high pressure compressed air, also removably affixed in the power unit compartment 16. Further details regarding the power supply means 50 and the compressor means 52 and their relation to each other, as well other elements in, on, and related to the power unit compartment 16, are provided later hereinafter.

Figure 8:
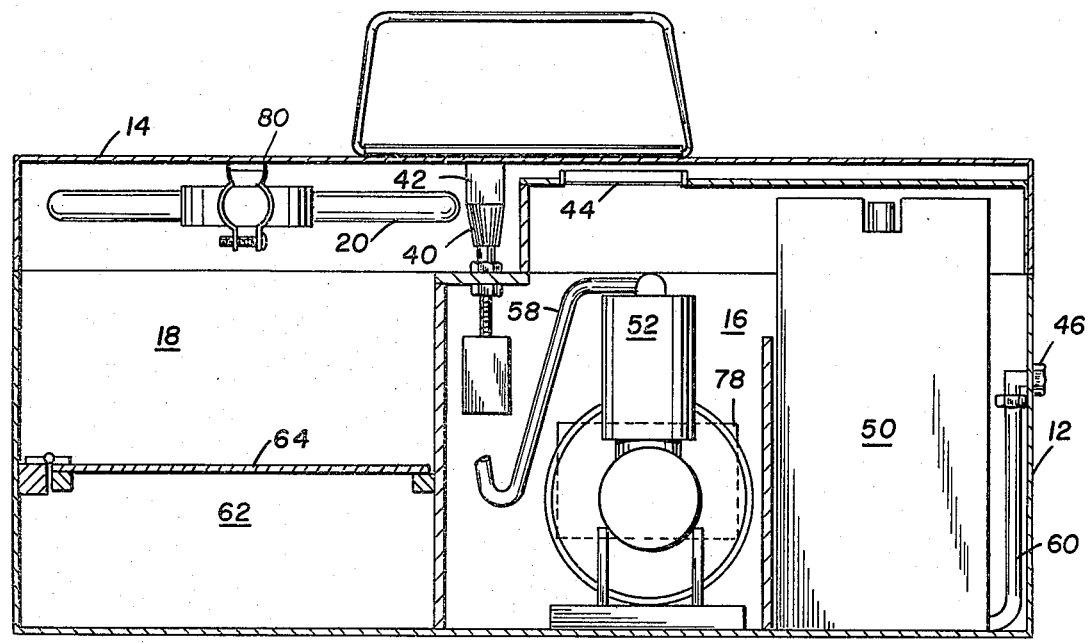
FIG. 8 is a vertical cross-sectional view of FIG. 3 on line 8—8, with cover closed.

The auxiliary compartment 18 is divided into an upper and lower portion by a covered sub-compartment at the bottom of the auxiliary equipment compartment 18. The covered sub-compartment is shown in FIGS. 3 and 8 as a sub-compartment 62 for storage of a battery charging means, which is described hereinafter, and auxiliary power connecting means, which is also described hereinafter, the sub-compartment 62 is covered by a hinged lid-like divider means 64.

It is to be understood that the hinged lid-like divider means 64 may also be a removably affixed or inserted divider means, and such an alternative is within the scope and intent of this invention. It is also to be understood that it is within the scope and intent of this invention to further divide the sub-compartment 62 into two or more areas, such as one area for the aforementioned battery charging means and one area for the aforementioned auxiliary power connecting means.

The upper or remaining portion of the auxiliary equipment compartment 18 may be utilized for various items of optional equipment, such as, but not limited to, portable lighting means. The aforementioned high pressure test component 20, a major item in the portable air test kit and system 10, is also stored in the auxiliary equipment compartment 18 by being removably affixed to the inside surface 80 of the lid or cover means 14 over the auxiliary equipment compartment 18 in the container means 12.

It is to be understood that the power supply means 50, which may be a wet cell battery, may also be a dry or gel cell battery, a solar power means, or any other suitable power supply means which will fit into the manually portable kit, and which is powerful enough to perform the requirements.

It is to be understood that the arrangement and placement of the power supply means 50, compressor means 52, the associated components, the various units of auxiliary equipment, and the high pressure test component 20, may be arranged and placed in any other manner within the kit. Such variations in arrangement and location that vary from that described hereinbefore or illustrated are within the scope and intent of this invention.

Turning to FIG. 1, the high pressure test component 20 can be seen in position and relation to the kit container means 12 portion of the portable air test kit and system 10, and in relation to a typical item to be tested 22. In this illustration a typical gas or liquid line means to be tested by a high pressure test is the item to be tested 22. It is to be understood that this item to be tested 22 may be any other unit that requires a pressure test and such a capability is within the scope and intent of this invention.

The high pressure test component 20 consists: of a first valved female quick-connect means 24, for removably connecting to the male quick-connecting means 38 of the portable air test kit and system 10; a cross-connector means 26, to which the first female quick-connect means 24 is removably affixed to a first connecting means of the cross-connector 26; a monitoring pressure gage means 28, removably affixed to a second connecting means of the cross-connector means 26; a manually operable pressure-relief valve means 30, removably affixed to a third connecting means of the cross-connector means 26; a high pressure hose means 32, a first end of which is removably affixed to a fourth connecting means of the cross-connector means 26; and a second valved female quick-connect means 34 removably affixed to a second end of the high pressure hose means 32.

In order to removably connect the distal end of the high pressure test component 20, at the second female quick-connect means 34, to the item to be tested 22, a coupling unit means 36 is required. This coupling unit means 36 consists of a male quick-connect means suitably removably affixed to a hardware-type means that can be removably affixed to the item to be tested 22 at a convenient connecting location. Such "hardware-type" means may be fabricated from pipe nipples, couplings, compression connectors, reducing couplings, unions, and other similar means to fit the needs at the site of the item to be tested 22. Where necessary, other means of connecting to the item to be tested 22 may be used.

Figure 2:
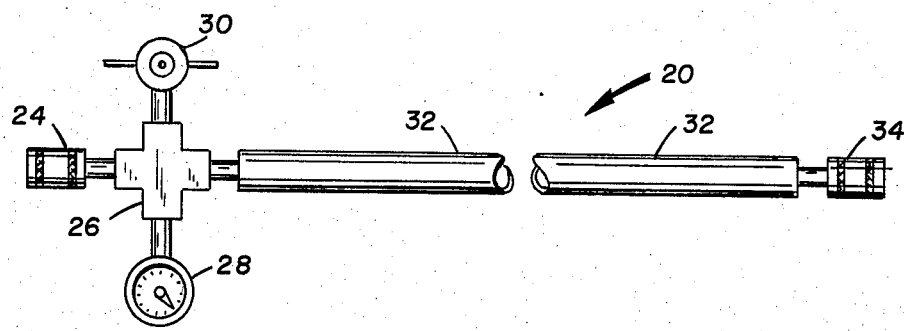
FIG. 2 is a pictorial side view of a high pressure test means for use with a portable air test kit as part of the system.

The high pressure test component 20 is shown assembled in FIGS. 1 and 2. In FIG. 1 the relation to the aforementioned male quick-connect means 38, the coupling unit means 36, and the item to be tested 22 is shown in an exploded arrangement.

Turning now to FIGS. 1, 3, 4, 5, and 8, a description is provided regarding certain internal connections and facilities regarding the power supply means 50, and the compressor means 52. When the portable air test kit and system 10 is to be used it is first connected to the unit to be tested 22 as shown in FIG. 1 and as described hereinbefore. The compressor means 52 is then activated by pulling outwardly the starter switch means 40.

The pull-push switch has been used so that an automatic shut-off means 42, located on the interior surface of the cover means 14, will press downwardly on the starter switch means 40 and shut off the compressor means 52 if the cover means 14 is closed on the portable air test kit while the compressor means 52 is running. It is to be understood that other modes or configurations of starter switches and automatic shut-off means may be used and such variations are within the scope and intent of the present invention.

Figure 4:
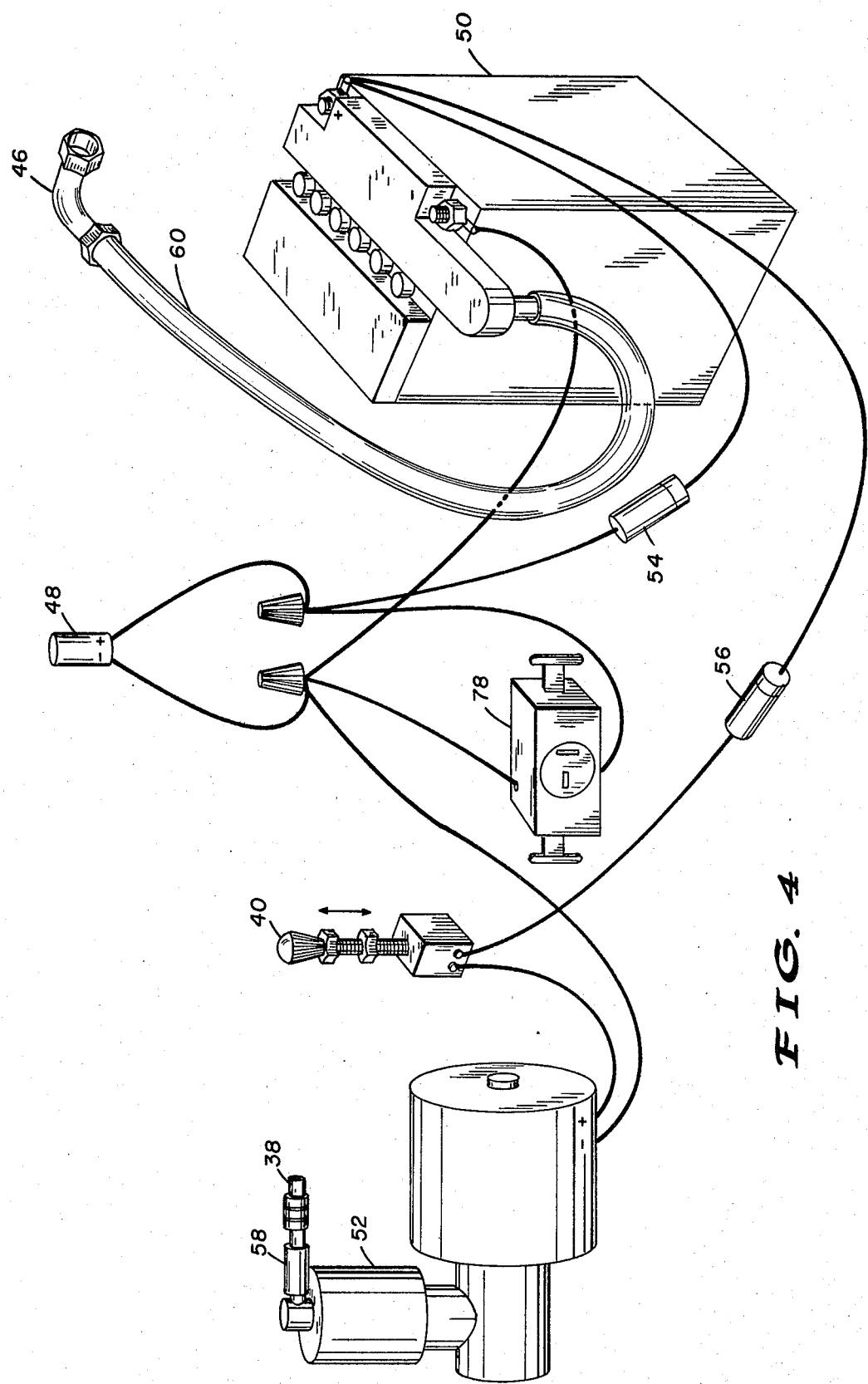
FIG. 4 is a pictorial schematic wiring diagram of the portable air test kit of FIG. 1.

The electrical connections of the starter switch 40, power supply means 50, and compressor means 52 are shown in FIG. 4. The pictorial schematic wiring diagram also shows a cigar-type lighter receptacle 48 and a prong type receptacle 78 as part of the electrical system. These latter elements, the receptacles 48 and 78, are further described hereinafter. The pictorial schematic wiring diagram of FIG. 4 also shows a first fuse means 54 and a second fuse means 56 in the circuit to protect the system from overload and provide a safe means of operating auxiliary equipment. These first and second fuse means 54 and 56 are conveniently located in suitable places within the power unit compartment 16. Other type circuit protection devices such as circuit breakers, etc. are within the scope and intent of the invention.

Figure 5:
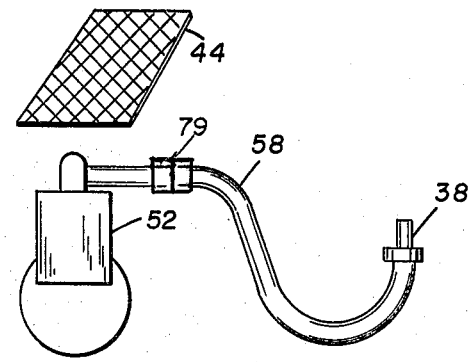
FIG. 5 is a partial pictorial view of a portion of the portable air test kit and system of FIG. 1.

A delivery high pressure hose means 58 removably affixed to the outlet of the compressor means 52 at one end is removably affixed at the other end to the male quick-connect means 34 as can be seen in FIGS. 4, 5, and 8. A union type mechanism is provided in this line to simplify connection 79. This provides for the compressed air to be externally available through the male quick-connect means 34 for subsequent connection and delivery by the high pressure test component 20 to the item to be tested 22.

A ventilation screen means 44 is located in the covering portion of the power unit compartment 16 to permit air to flow to the air intake of the compressor means 52. The ventilation screen means 44 may be removably insertable or may be hinged (as illustrated) to permit accesss to the power unit compartment 16 for periodic maintenance (such as lubrication and filter replacement) and to service the power supply means 50, the compressor means 52, the fuse means 54 and 56, and such other service as may be necessary.

A hose-like means 60 connects the vent facility of the power supply means 50 to ventilation outlet 46 to the atmosphere. This vents any hydrogen gas or other explosive type gases to atmosphere that may be generated within the power supply means 50 and prevents a hazardous and explosive condition developing within the power unit compartment 16.

Figure 6:
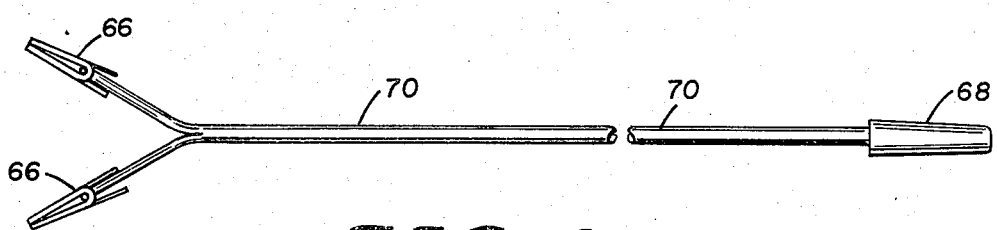
FIG. 6 is a pictorial view of a connector means for auxiliary power supply for a portable air test kit.

Turning now to FIG. 6, a pictorial view of a connector means for an auxiliary power supply is shown. The connector means for an auxiliary power supply consists of a pair of alligator-type clips 66 and a male cigar-type lighter plug means 68, both electrically connected by wires 70 affixed thereto. This auxiliary piece of equipment permits supplementing the power supply means 50 with additional power from any piece of power supply equipment of a comparable voltage. This is particularly useful when the length of time involved or the number of tests to be made has a possibility of seriously draining the power supply means 50 before the power supply means 50 can be recharged.

Figure 7:
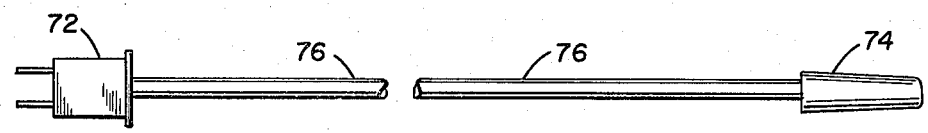
FIG. 7 is a pictorial view of a connector means for recharging a power supply means for a portable air test kit.

Turning now to FIG. 7, a pictorial view of a connector means for recharging is shown. The connector means for recharging consists of a plug-type recharging unit 72 and a male cigar-type lighter plug means 74, both electrically connected by wires 76 affixed thereto. This recharging unit permits maintaining the charge on the power supply 50 when not being used. The plug-type recharging unit 72 facilitates plugging into a 120 volt alternating current receptacle.

The elements of the structure in the power unit compartment 16 are suitably affixed in place at locations substantially as shown in FIGS. 3 and 8.

A supplemental receptacle means 78 for auxiliary equipment connections, as shown in FIG. 4, is installed in the container means 12 substantially as shown in FIG. 8, with access to the supplemental receptacle means 78 from the rearmost exterior side of the container means 12. The supplemental receptacle means 78 facilitates the use of such auxiliary equipment as a drill, saw, impact gun and other such units. Depending upon the air tests being made, the necessary auxiliary equipment, such as some of those mentioned, can normally be carried in the upper portion of the auxiliary equipment compartment 18.

It is also to be noted that a similar auxiliary light, blower, vacuum device, or such units can also be operated by plugging into the female cigar lighter-type receptacle 48 if equipped with a male cigar lighter-type plug and be carried in the upper portion of the auxiliary equipment compartment 18.

It is to be noted that the portable air test kit and system 10 has other collateral uses to which it can be adapted, such as in piping work the inflation of stopper bags and such requirements by utilizing appropriate compression connectors to high test component 20.

The portable air test kit and system 10 provides a close control because of the small air volume produced. Complete control of the pressure cycle is available until the target pressure is reached. When the target pressure is obtained, as observed on the indicating pressure gage means 28, the switch means 40 is turned off which stops the compressor means 52.

Once an item being tested 22 is under the required pressure for the test and the compressor means 52 has been shut off, the pressure condition can be observed on the pressure gage means 28 to determine if there are any leaks for the required length of time. This may be accomplished by physically removing the high test component 20 from 38 or leaving the two intact. After the test is concluded the air pressure is relieved by opening the pressure relief valve means 30. Such pressure tests may be made with this invention on piping, tanks, or other pressure-type means or vessels that may carry natural or artificial gases, oil, gasoline, water, and other such gases or liquids. The portable air test kit and system 10 is particularly useful where the total air volume requirement for a test is reasonably small. It can, however, be used for tests that require a larger volume of air; in the latter case, however, it would be desirable to utilize the auxiliary connector means (FIG. 6), described previously, to supplement the power supply means so as to maintain the charge in the built-in power supply means 50.

It is also to be noted and understood that a power supply means take-off may be connected to a 120 volt AC power supply (similar in structure to the recharging means in FIG. 7) when such power supply means is available and accessible. Such a variation is within the scope and intent of this invention.

Another advantage of the present invention over the prior art is that the large two-type compressors, operating at high pressure with large volumes initially, will almost instantaneously bring a small unit, that is to be tested, possibly beyond the target testing pressure, because of the small volume required. The present invention, by its small volume output, provides a controllable means as well as a safe means.

The economic savings of the cost of the present portable air test kit and apparatus 10 in comparison with the cost of large compressor-type equipment or compressed air cylinders of the prior art, is an obvious advantage.

As can be readily understood from the foregoing description of the invention, the present structure can be configured in different modes to provide the ability to make an air test on an item to be tested, or to perform the various auxiliary operations that have been mentioned.

Accordingly, modifications and variations to which the invention is susceptible, may be practiced without departing from the scope and intent of the appended claims.

What is claimed is:

1. A portable air test kit and system, comprising:
   a container means, said container means having a suitable closure means;
   a power supply means, said power supply means being removably affixed within said container means, said power supply means having an electrical wiring system associated therewith;
   a compressor means, said compressor means having an outlet means, said compressor means being removably affixed within said container means, said compressor means having an attached associated motive power means, said associated motive power means being suitably connected to said power supply means;
   a starter means, said starter means having an automatic stop means associated therewith when said closure means is closed on said container means; and
   a high pressure test means, said high pressure test means being separately stored within said container means when not in use, said high pressure test means being removably connected to said compressor means when in a testing configuration, said high pressure test means consisting of a first valved female quick-connect means, a second valved female quick-connect means, a high pressure hose means, a pressure gage means, a relief valve means, and a cross-connector means, said cross-connector means having four separate connecting means, said first female quick-connect means being removably affixed to a first connecting means of said cross-connector means, said high pressure hose means having a first and thereof being removably affixed to a second connecting means of said cross-connector means, said pressure gage means being removably affixed to a third connecting means of said cross-connector means, and said valve means being removably affixed to a fourth connecting means of said cross-connector means, said valve means serving as a pressure relief valve when manually opened, and said second female quick-connect means being removably affixed to the distal second end of said high pressure hose means.

2. A portable air test kit and system as recited in claim 1, wherein said portable air test and system is manually portable.

3. A portable air test kit and system as recited in claim 1, wherein said container means has substantially the configuration of a manually carriable tool box-like shape.

4. A portable air test kit and system as recited in claim 1, wherein said power supply means is a battery, said battery being similar, but not limited, to a motorcycle battery.

5. A portable air test kit and system as recited in claim 1, wherein said compressor means is an air compressor and said associated motive power means is an electrically operated motor.

6. A portable air test kit and system as recited in claim 5, wherein said compressor means has a small volume output.

7. A portable air test kit and system as recited in claim 1, wherein said starter means is an electric switch, said electric switch being a pull-push type, said "pull" mode being the "on" position, said "push" mode being the "off" position.

8. A portable air test kit and system as recited in claim 7, wherein said automatic stop means is located within said closure means, said automatic stop means pushing said starter means to said "off" position when said closure means is closed on said container means.

9. A portable air kit and system as recited in claim 1 and additionally, a first male quick-connector means suitably connected to said outlet means of said compressor means, said first female quick-connect means being removably connected to said first male quick-connect means to effect said high pressure test means connection to said compressor means for said testing configuration.

10. A portable air test kit and system as recited in claim 9 and additionally, a coupling means and a structure to be tested, said coupling means consisting of a second male quick-connect means affixed to a suitable connector means, said connector means being of a configuration to allow affixing to said structure to be tested, said second male quick-connect means being removably connected to said second female quick-connect means.

11. A portable air test kit and system as recited in claim 1, wherein said container means is suitably partitioned into a first compartment and a second compartment, said power supply means and said compressor means being located within said first compartment, said second compartment being further partitioned into at least two separate portions, said first and second compartments extending upwardly into said closure means.

12. A portable air test kit and system as recited in claim 11 and additionally an auxiliary power supply means, a first electrical receptacle means, and an auxiliary power supply connector means, said auxiliary power supply connector means consisting of a pair of electrical connector means, a first electrical plug means and suitable electrical wiring connecting said electrical connector means to said first electrical plug means, said electrical connector means being removably connected to said auxiliary power supply means, said first electrical receptacle means being suitably connected to said power supply means, and said first electrical plug means being removably connected to said first electrical receptacle means when auxiliary power may be required.

13. A portable air test kit and system as recited in claim 12 and additionally an electrical recharging means and a 120 volt electrical supply means, said electrical recharging means consisting of a 120 volt plug type recharging means, a second electrical plug means, and suitable electrical wiring connecting said 120 volt plug type recharging means to said second electrical plug means, said 120 volt plug type recharging means being removably connected to said 120 volt electrical supply means, said second electrical plug means being alternatively removably connected to said first electrical receptacle means when said power supply means may require recharging.

14. A portable air test kit and system as recited in claim 13, wherein said auxiliary power supply connector means, and said electrical recharging means may be stored in at least one of said separate portions of said second compartment, said separate portions of second compartment also providing storage space for other accessories as may be desired, including said high pressure test means.

15. A portable air test kit and system as recited in claim 1 and additionally, suitable fused means in said associated electrical wiring systems, and a second electrical receptacle means, said second electrical receptacle means being electrical connected to the power supply means, said second electrical receptacle means being suitably located within said container means with access thereto for any desired auxiliary power equipment and appropriately fused protected.

16. A portable air test kit and system as recited in claim 1 and additionally a vent means for said power supply means, said vent means being suitably connected to said power supply means and capable of communicating therewith, said vent means further communicating with the atmosphere exterior to said container means, and mechanically affixed.

17. A portable air test kit and system as recited in claim 11, wherein said first compartment is suitably covered by a cover means, said cover means having a portion thereof consisting of a screen-type ventilation means.

* * * * *

UNITED STATES PATENT AND TRADEMARK OFFICE
CERTIFICATE OF CORRECTION

PATENT NO. : 4,375,162

DATED : March 1, 1983

INVENTOR(S) : Robert S. Eppley

It is certified that error appears in the above-identified patent and that said Letters Patent is hereby corrected as shown below:

Column 5, line 67, "two" should read -- tow --.

Column 6, line 65, after "test" insert -- kit --.

Column 7, line 24, after "air" insert -- test --.

Signed and Sealed this

Eighth Day of May 1984

[SEAL]

Attest:

GERALD J. MOSSINGHOFF

Attesting Officer

Commissioner of Patents and Trademarks